(12) United States Patent
Chen

(10) Patent No.: US 6,381,133 B1
(45) Date of Patent: Apr. 30, 2002

(54) AUTOMOBILE COMPUTER DOCK

(76) Inventor: Jack Chen, 14 Kimberly Cir., Oak Brook, IL (US) 60421

( * ) Notice: Subject to any disclaimer, the term of this patent is extended or adjusted under 35 U.S.C. 154(b) by 0 days.

(21) Appl. No.: 09/425,924

(22) Filed: Oct. 25, 1999

(51) Int. Cl.⁷ .............................. G06F 1/16; H05K 5/02; B60Q 1/26
(52) U.S. Cl. ........................ 361/686; 361/683; 361/724; 307/10.1; 312/21; 312/30; 248/918
(58) Field of Search ................................ 361/683, 686, 361/724, 679; 312/21–30, 223.1–223.3; 307/10.1; 248/918; 701/1, 33, 208

(56) References Cited

U.S. PATENT DOCUMENTS

| | | | |
|---|---|---|---|
| 4,787,040 A | * 11/1988 | Ames et al. | 364/424.01 |
| 4,854,538 A | 8/1989 | Von Schalscha | |
| 4,868,542 A | * 9/1989 | Thompson | 340/468 |
| 5,086,510 A | * 2/1992 | Guenther et al. | 455/90 |
| 5,177,665 A | 1/1993 | Frank | |
| 5,199,772 A | 4/1993 | Jordan | |
| 5,555,491 A | * 9/1996 | Tao | 361/686 |
| 5,619,395 A | 4/1997 | McBride | |
| 5,673,628 A | 10/1997 | Boos | |
| 5,765,736 A | 6/1998 | Fischer | |
| 5,859,762 A | * 1/1999 | Clark et al. | 361/686 |
| 5,864,481 A | 1/1999 | Gross | |
| 5,973,917 A | * 10/1999 | White | 361/683 |
| 6,009,363 A | * 12/1999 | Beckert et al. | 701/33 |

FOREIGN PATENT DOCUMENTS

| | | |
|---|---|---|
| DE | 4135316 A1 | 4/1993 |
| DE | 4228605 A1 | 3/1994 |
| JP | 406072252 A | 3/1994 |

* cited by examiner

*Primary Examiner*—Gerald Tolin
*Assistant Examiner*—Lisa Lea-Edmonds
(74) *Attorney, Agent, or Firm*—Robert L. Marsh

(57) ABSTRACT

A computer dock for use in a vehicle has a retainer body suitable for mounting in the vehicle. A moveable member is moveable with respect to the body from a retracted position within the body to an extended position, and a mounting on the moveable members retains a notebook computer. The dock has a plurality of cables for connecting power from the vehicle and for connecting a cell phone and other facilities in the vehicle to the computer.

21 Claims, 6 Drawing Sheets

AUTOMOBILE COMPUTER DOCK

The present invention relates to a support facility for use with a portable computer and, in particular, to a computer dock which is retractable into the console of an automobile.

BACKGROUND OF THE INVENTION

Improvements in semiconductor technology have resulted in powerful computers being available in very small sizes, commonly known as notebook computers. A notebook computer contains all the computing capabilities of a much larger PC, but its small size creates certain limitations. For example, a notebook computer typically contains a limited power supply such that it is useable for only a short period of time without recharging the nickel cadmium batteries therein. Also, notebook computers usually do not include a device for reading CD-ROM's, nor can they receive e-mail unless they include a modem and have a connecting cable to a telephone line, nor can they interact with a global positioning system without having a connector attached to a global positioning receiver.

Devices are available to provide some or all of the support needed to enable a notebook computer to have the performance of a PC, but some existing devices require attachment to a commercially available AC power line. Users of notebook computers, therefore, who primarily operate from their vehicle, such as traveling salesmen and the like, are unable to use existing support facilities in conjunction with their notebook computers. The absence of such supporting devices limits the usefulness of a small computer to those who make extensive use of automobiles.

Adapter lines exist for providing power to a notebook computer from the electric system of an automobile by plugging into the cigarette lighter thereof. Also, mountings exist for mounting a small computer to the floor of a vehicle such that it is accessible to the driver or the front seat passenger. Such adapters, however, do not provide the support needed to enable by a notebook computer to provide all the capabilities available from a common PC. Specifically, existing devices useable in an automobile do not permit communication with a telephone system such that e-mail can be sent or received, nor for attachment to a global positioning receiving device for providing global positioning information, nor readers for CD ROM's or floppy discs.

As a practical matter, a computer cannot be built into a vehicle because a permanent mounting would limit the portability of the unit. It would, therefore, be desirable to provide a computer dock or the like which would offer a more complete support to a notebook computer such that it would be used in an automobile and be able to provide all of the functions of a PC.

SUMMARY OF THE INVENTION

Briefly, the present invention is embodied in a computer dock for use in a vehicle having a central console in the dashboard thereof, and behind or beneath the central console is a cavity which is accessible through an opening in or below the console. The dock has a retainer body which is sized to fit within the cavity and be retained therein by screws or the like so as to be affixed to the vehicle. A moveable member is moveable with respect to the retainer body from a first retracted position wherein the moveable member is within the cavity, to a second extended position wherein at least a portion of the moveable member extends through the opening in the console.

In the preferred embodiment, the moveable member has a mounting plate pivotally mounted thereon and the mounting plate has attachment means for attaching a notebook computer thereto. A cable connected to the power system of the vehicle has a connector at the end thereof which is attached to the moveable member for connecting into a jack on the computer for providing power thereto.

In addition to providing power to the dock, the dock may have a second cable, which is attached to a global positioning receiving device, a third cable which is connected to a cellular telephone, a fourth cable connected to a CD ROM and a fifth cable connected to a floppy disc reader. All of the foregoing cables extend to the moveable member with the distal ends thereof connectable to the notebook computer attached thereto. The dock of the present invention, therefore, will provide the support necessary to a notebook computer to enable it to have all of the functions of a fully functional PC.

In the preferred embodiment, the moveable member is sized such that the moveable member with the computer attached thereto can be retracted through the opening and into the retainer body so as to be completely out of sight when not in use.

BRIEF DESCRIPTION OF THE DRAWINGS

A better understanding of the present invention will be had after a reading of the following detailed description taken in conjunction with drawings wherein.

DETAILED DESCRIPTION OF THE PREFERRED EMBODIMENT

Figure 1:
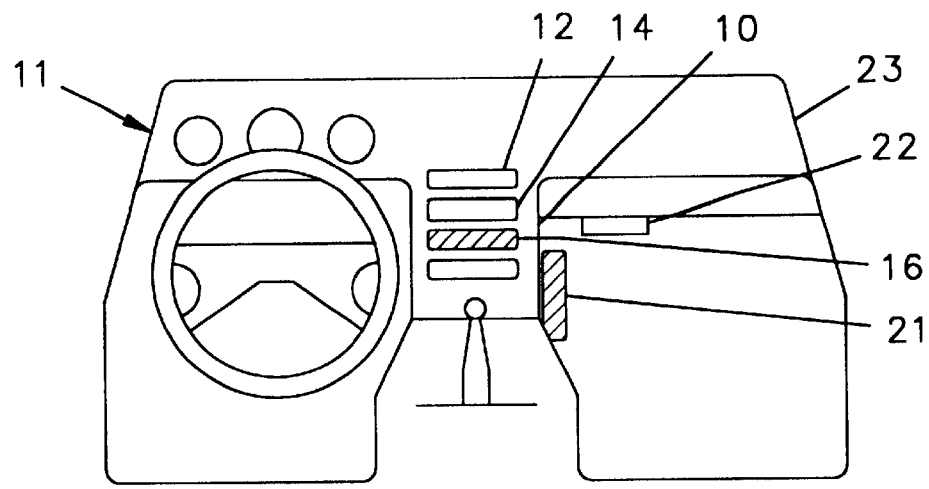
FIG. 1 is a front elevational view of the console of an automobile showing three locations for storing a computer dock in accordance with the invention, one location being a cavity behind the console and accessible through a slot, the second location being along the passenger side foot well, and the third location being under the dashboard.
Figure 2:
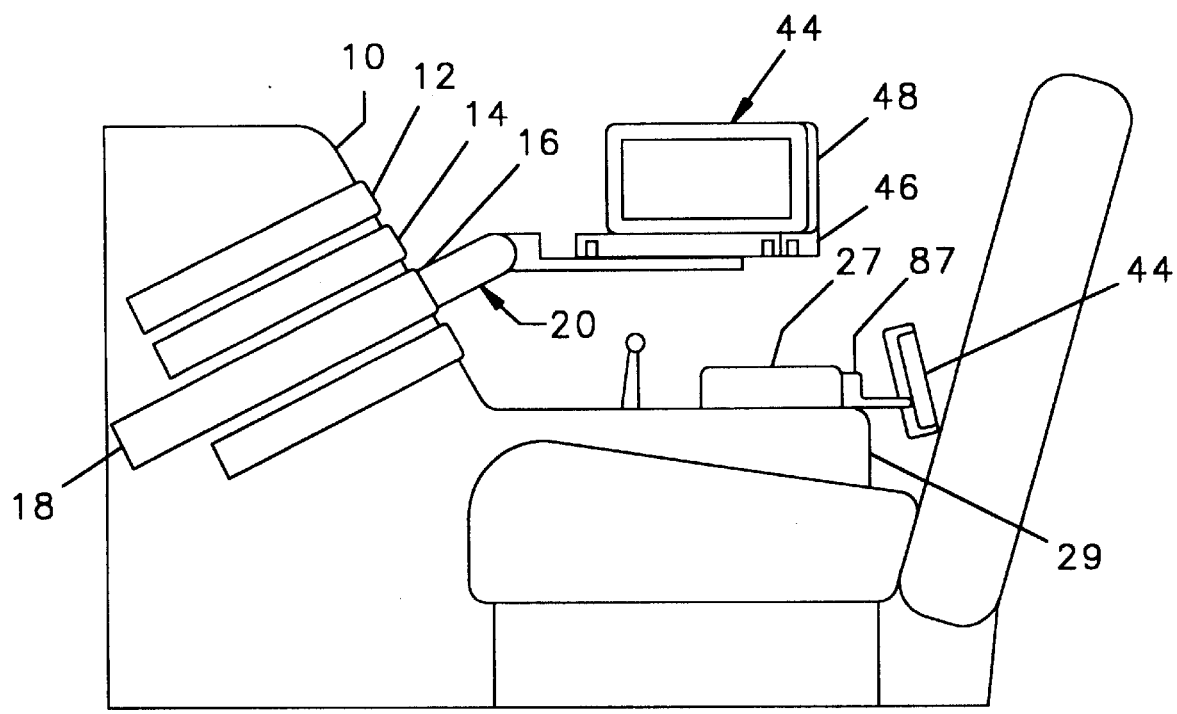
FIG. 2 is a cross sectional view of the console of an automobile showing a computer dock mounted behind the console with a moveable member extended through the opening thereof.

The console of an automobile is positioned below the dashboard and between the driver and passenger of an automobile and has cavities therein for retaining appliances useable by both the driver and passenger. The appliances in the console include controls for heating and air conditioning, a radio, an ashtray with a cigarette lighter, and sometimes a retainer slot for miscellaneous items such as maps, coins for tolls, and the like. All such appliances are adapted to fit within apertures in the console having a width of 7¼ inches Referring to FIGS. 1 and 2, the dock of the present invention is useable in the console 10 of an automobile 11 having heating and air conditioning controls 12 and a radio 14. The console 10 has been configured to include an additional opening 16, and behind the console 10 and the opening 16 is a cavity 18 into which is fitted a housing 19 for retaining a computer dock 20 in accordance with the present invention. As shown in FIG. 1, a housing 21 for a computer dock may be positioned along one side of the passenger foot well 25 as further described below, or a housing 22 may be positioned below the dashboard 23. As shown in FIG. 2, a housing 27 for a computer dock may also be mounted on the transmission enclosure 29 so as to be visible to passengers in the back seat.

Figure 3:
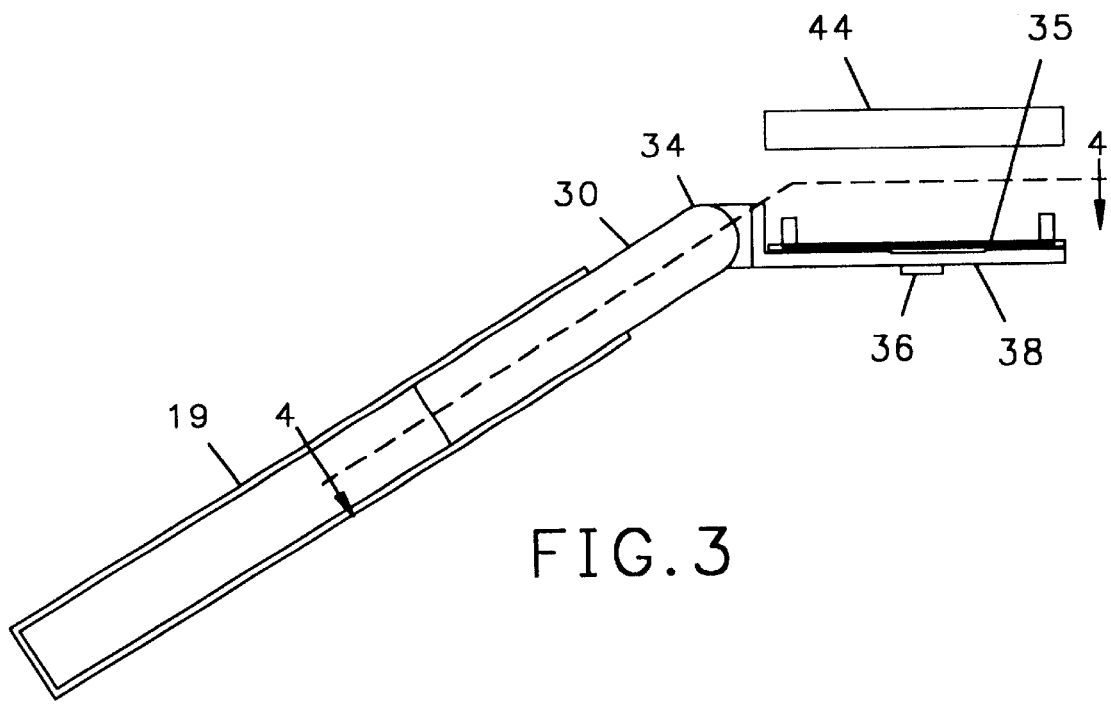
FIG. 3 is a side elevational view of the computer dock shown in FIG. 2 with the dock removed from the console shown in FIG. 1, the table oriented level, and a computer ready to be mounted thereto.
Figure 4:
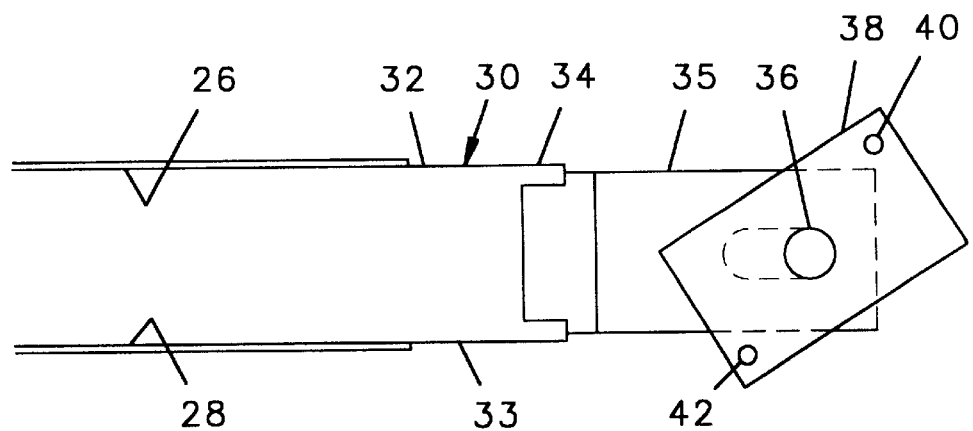
FIG. 4 is a top, partially cross sectional, view of the retainer and computer dock shown in FIGS. 2 and 3.

Referring to FIGS. 3 and 4, the housing 19 is retained within the cavity 18 by any suitable means such as a plurality of screws, not shown. On the inner sides of the housing 19 are a pair of tracks 26, 28 and slideable within the tracks 26, 28 is a slide member 30 having an axis 31. The sides 32, 33 of the slide member 30 are complementary in shape to the inner surfaces of tracks 26, 28 for slideable movement therein.

Referring to FIGS. 2 and 3, the housing 19 may be mounted at an angle as shown. The accommodate the angular mounting of the housing 19, the slide member 30 has a horizontally oriented pivot pin 34 which extends through sides 32, 33 thereof, and pivotally attached to slide member 30 by the pin 34 is a table 35. The table 35 is moveable about the pivot 34 from a first orientation, in which the table 35 is aligned with the axis 31 of the slide member 30 and a second orientation in which the table 35 is angled with respect to the axis 31 of the slide member 30 so as to be substantially horizontal a shown in FIG. 3. When the table 35 is positioned in the first orientation the slide member 30 and the table 35 can be retracted into the housing 19 for storage, and when the table 35 is positioned in the second orientation with the slide member 30 extended from the house 35, the upper surface of the table will be substantially level as shown.

Referring to FIGS. 1, 3 and 4, extending perpendicular to the upper surface of the table 35 is a pivot pin 36 and mounted on the pin 36 to a rotatable retainer 38 having mounting holes 40, 42 for removeably mounting a notebook computer 44. Although the longest sides 45 of existing notebook computers are longer than the 7¼ inch maximum width of the opening in a console 10, the dock 20 with the computer 44 attached to the table 35 can be retracted through the opening 16 in a console by rotating the computer 44 about pin 36 until the longest sides 45 are parallel to the axis 31 of the slide member 30.

The notebook computer 44 includes a body 46, the upper surface of which is a keypad, not shown, and pivotally attached to the body 46 is an upper panel 48 having a viewing screen 49 on the lower surface thereof. When the table 35 and the slide members 30 are extended outward of the opening 16 as shown in FIG. 3, the computer 44 can be rotated around the vertical pin 36 so as to be useable by the driver or the front seat passenger of the vehicle 11. When not in use, the upper panel 48 can be folded against the body 46 and the slide member 30, with the computer 44 thereon can be moved to the retracted position within the housing 19. As can be seen, the cavity 18 must be deep enough to accommodate the computer dock 20 with the computer 44 attached.

Figure 5:
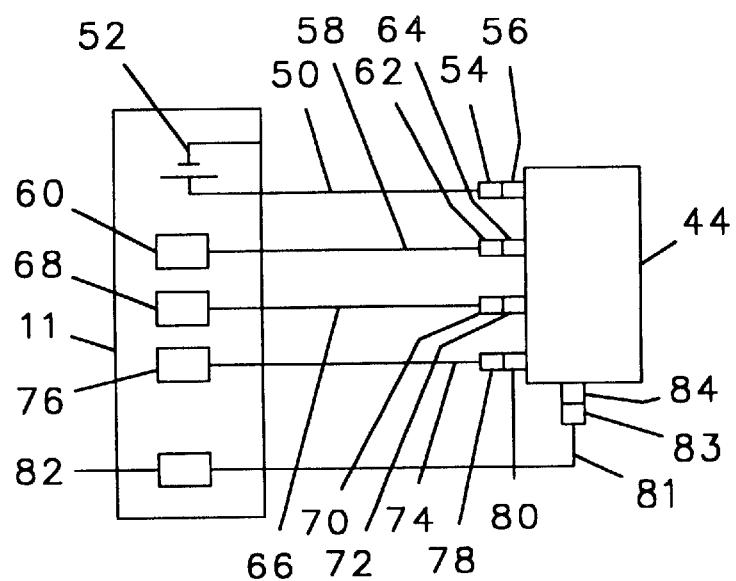
FIG. 5 is a schematic view of the electrical attachments for the dock shown in FIGS. 2, 3, and 4.

Referring to FIG. 5, the invention further includes a plurality of cables for providing electronic support to the computer 44. Specifically, a power cable 50 has one end thereof connected to the electrical system 52 of the vehicle 10 and the opposite end has a connector 54 thereon for attachment to a jack 56 on the computer 44 such that power from the vehicle can be used to operate the computer 44 and recharge the batteries thereon. A second cable 58 has one end connected to a cellular telephone 60 built within the vehicle 11, and the opposite end thereof extends to the table 35 and has a connector 62 for attachment into a jack 64 on the computer 44. Similarly, a third cable 66 has one end connected to a global positioning detector 68 and the other end has a connector 70 for attachment to a jack 72 on the computer 44. A fourth cable 74 has one end connected to a CD ROM 76 and the other end has a connector 78 for attachment into a jack 80 on the computer 44, and a fifth cable 81 has one end connected to a floppy disc reader 82 and a connector 83 on the second end for connecting into a jack 84 on the computer 44.

As shown in FIG. 1, a housing 21 can be mounted under the dashboard of the automobile or a housing 23 can be mounted in the passenger foot well 25. The slide member 30, the table 35, and the computer 44 as previously described are useable in housing 21, however the parts are not required to fit through the 7¼ inch space limitation required of an appliance mounted in the console. The pivot 36, therefore, can be omitted.

Figure 6:
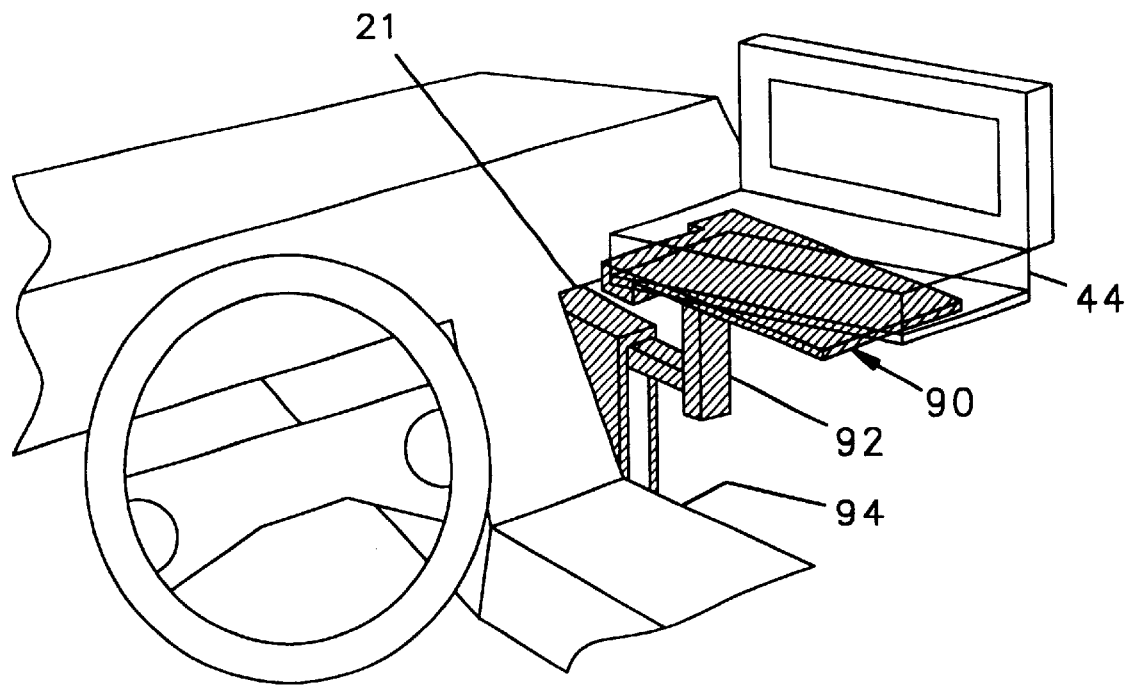
FIG. 6 is an isometric view of a notebook computer mounted on a dock in accordance with a second embodiment of the invention.

Referring to FIGS. 1 and 6, to fit within a housing 23 positioned along the passenger foot well 25 a collapsible arm 86 is required. The arm 86 has pivots and joints as needed such that the parts may be stored in the housing 23 when the arm 86 is collapsed.

Figure 7:
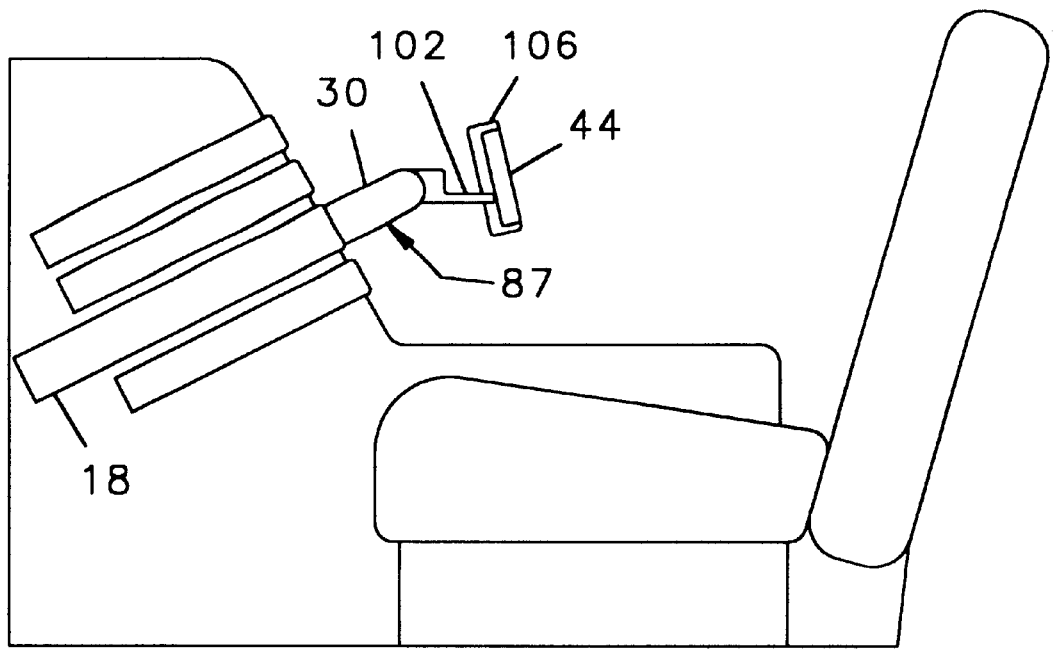
FIG. 7 is a cross sectional view of the console of an automobile showing a third embodiment of a computer dock.
Figure 8:
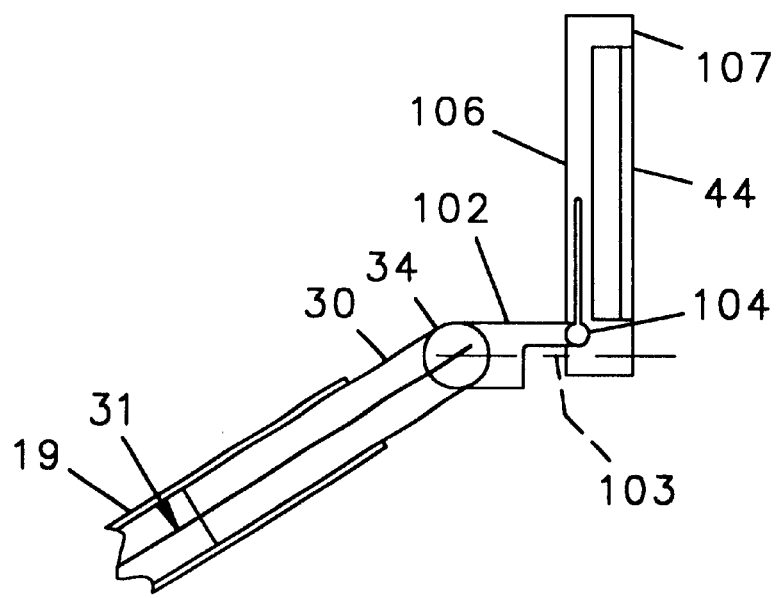
FIG. 8 is a fragmentary side elevational view of the dock shown in FIG. 7 with the computer attached thereto.

Referring to FIGS. 7–11 in another embodiment a dock 87 is adapted to retain a notebook computer 44 with the keypad 88 folded behind the viewing screen 90 as shown in FIG. 7. In the discussion of this embodiment elements like those described with respect to the first embodiment have like indicia numbers. As with the first embodiment, the dock 20 is adapted to be withdrawn into a housing 19 which may be positioned in a cavity 18 behind the console 10. A slide member 30 has an axis 31 and is moveable between a retracted position and as extended position as shown. To compensate for the angular mounting of the slide member 30, an adjustable member 102 is pivotally mounted to the end thereof on a pin 34 to be moveable from a first position in which the axis 103 thereof is aligned with the axis 31 of the slide member 30 to a second position in which the upper surface thereof is substantially level. Rotatable about a second pin 104 on the distal end of the adjustment member 102 is a retainer 106 having mountings 107 therein, not shown, for releaseably retaining a notebook computer 44 the housing of which has been modified as described below.

Figure 9:
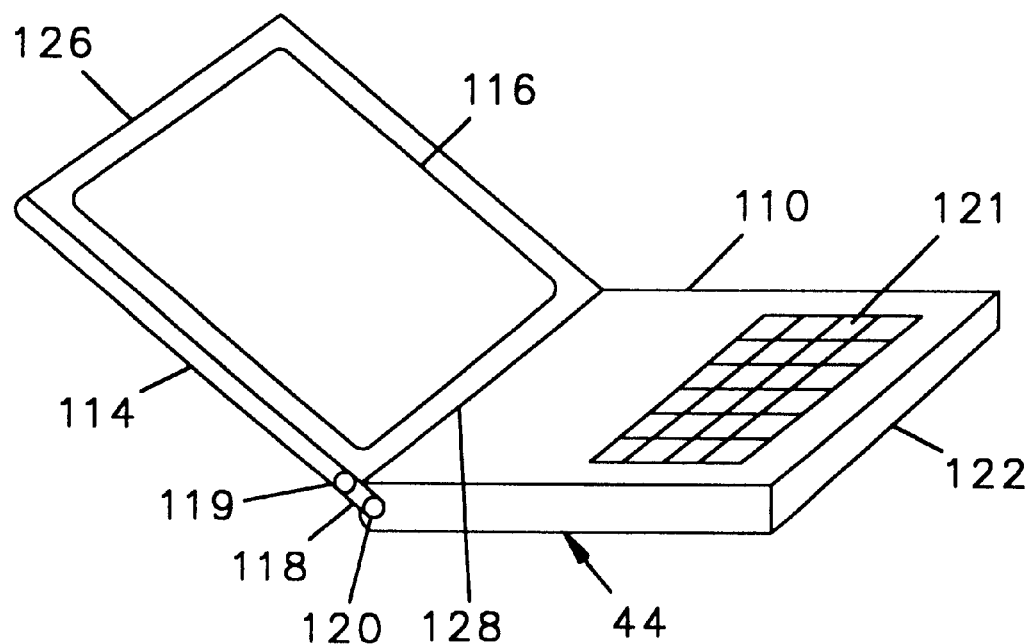
FIG. 9 is an isometric view of a computer for use with the dock shown in FIG. 7 with the viewing screen positioned to be visible while the keyboard is in use.
Figure 10:
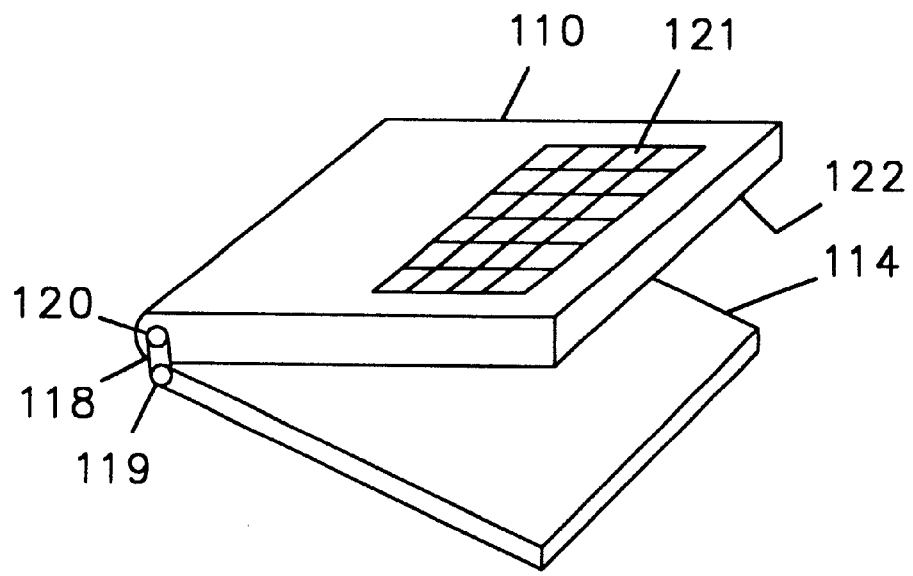
FIG. 10 is an isometric view of the computer shown in FIG. 9 with the cover folded behind the housing.

As shown in FIGS. 9 and 10, the cover panel 114 which retain the screen 116 of the computer 44 is retained to the housing 110 by a pair of mounting bars, one of which 118 is visible. One end of each mounting bar 118 is pivotally attached on pins 119 to opposite sides of the cover panel 114 and the second end of each bar is rotatably attached on pivot pins 120 to opposite sides of the housing 110. As shown, the pivot pins 120 are positioned midway between the upper surface having the keypad 121, and the lower surface 122 such that the viewing screen 116 is moveable around one end 124 of the housing 110. As shown, the viewing screen 116 is moveable from a first orientation depicted in FIG. 9 where it can be seen by an operator using the keypad 121, to a second orientation depicted in FIG. 10 in which the back of the cover panel 114 is folded against the lower surface 122 of the housing 110. The computer 44 is then secured to the retainer 106 with the viewing screen 116 is visible to the occupants of the vehicle and the keypad 121 directed towards the console as shown in FIG. 7.

Figure 11:
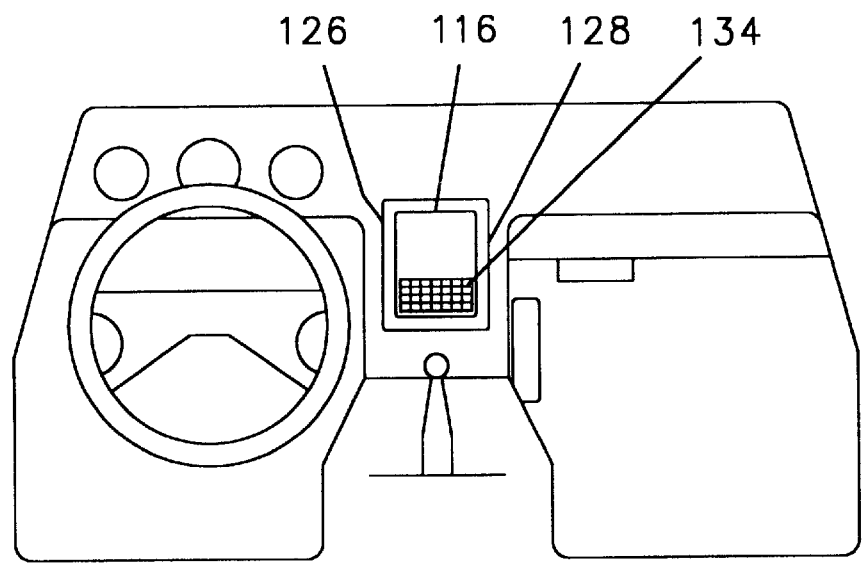
FIG. 11 is a fragmentary front elevational view of the computer and computer dock shown in FIG. 7.

Referring to FIG. 11, when the computer 44 is mounted to the retainer 116 the long sides 126, 128 of the cover panel 114 will be vertically oriented and the short sides 103, 132 will be horizontally oriented as shown. To use the computer 44, software is required to rotate the orientation of the viewing screen by 90 degrees. Also, to input information into the computer 44 when it is mounted on the retainer 106, a virtual keyboard 134 must be projected along the lower portion of the viewing screen 116 using currently available software.

Figure 12:
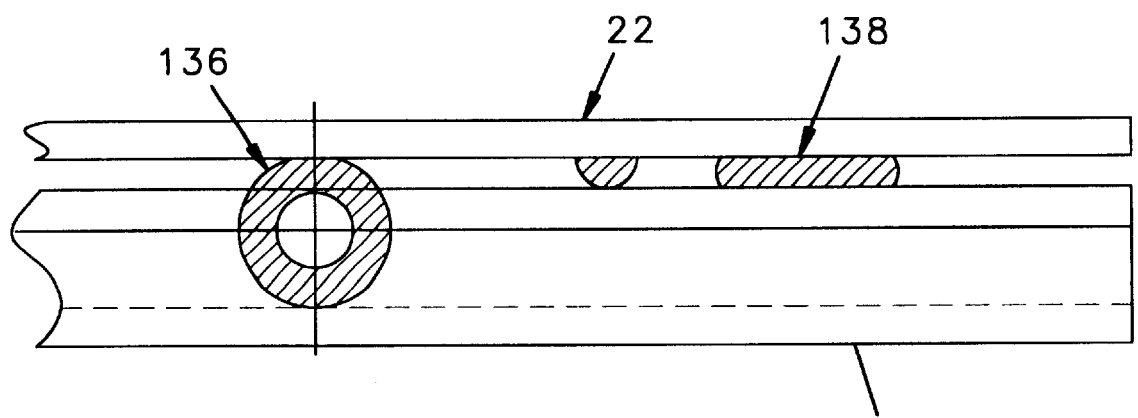
FIG. 12 is a schematic view of various shock absorbing members between the retainer body and the slide members of the invention.

Referring to FIG. 12, to reduce the shock caused by vehicle movement, shock absorbing rollers 136, or shock absorbing pads 138 are fitted between the retainer body 22 and the slide member 30.

As can be seen, when the computer 44 is attached to the dock 20, 87 in the vehicle 11, power will be supplied to the computer 44 through the first cable 50 and telephone communications capable of providing e-mail will be provided through the second cable 58. The third cable 66 will provide input from the global positioning detector 68, the fourth cable 74 will enable the computer 44 to read a CD ROM 76 and the fifth cable 81 will enable it to read floppy discs. When attached to the table 34 of the first embodiment, the computer 44 can be pivoted so as to be readily useable or accessible to either the driver or the front seat passenger of the vehicle 11. When not in use, the computer 44 can be collapsed and the table 34 can be telescoped through the opening 16 and into the retainer body 22 such that it is out of sight. The same availability is provided when the computer 44 is retained to the retainer 116 of the second embodiment.

While the present invention has been disclosed with respect to a number of embodiments, it will be appreciated that many modifications and variations can be made without departing from the true spirit and scope of the present invention. It is, therefore, the intent of the following claims to cover all such modifications and variations which fall within the true spirit and scope of the invention.

What is claimed:

1. A dock for retaining a computer having a jack for receiving a connector for a power cable, said dock for use in a vehicle having a console behind which is a cavity accessible through an opening in said console, a front seat adjacent said console, and said vehicle further having an electrical system, said dock comprising
    a housing sized to fit within said cavity,
    first attachment means for attaching said housing to said vehicle and within said cavity,
    a moveable member moveable with respect to said housing from a retracted position wherein said moveable member is within said housing, to an extended position wherein a portion of said moveable member extends through said opening in said console,
    slide means in said housing and on said moveable means for providing linear sliding movement of said moveable means from said retracted position to said extended position,
    a table having an attachment surface for retaining a computer thereto,
    said attachment surface defining a plane,
    pivot means between said moveable member and said table, and said pivot means for moving said table between a first position in which said plane of said table is parallel to the direction of said linear sliding movement of said moveable means to a second position in which said a screen of said computer retained to said attachment surface is visible to a passenger in said front seat, and
    a cable for connecting power from said electrical system of said vehicle to said jack of said computer while said computer is attached to said table.

2. The dock of claim 1 wherein said moveable member is moveable to said retracted position with said computer attached thereto.

3. The dock of claim 1 and further comprising
    a cable having a first end and a second end,
    said first end connectable into said electrical systems of said vehicle,
    said second end having a connector for attachment to said jack of said computer.

4. The dock of claim 1 for use in a vehicle having a global positioning detector, and said computer having a jack for receiving a connector for a global positioning detector, said dock further comprising
    a cable having a first end and a second end,
    said first end of said cable connectable to said global positioning detector,
    said second end having a connector for attachment to said jack for receiving a connector for a global positioning detector.

5. The dock of claim 1 for use in a vehicle having a cellular telephone therein and said computer having a jack for receiving a connector for a telephone line, said dock further comprising
    a cable having a first end and a second end,
    said first end of said cable connectable to said cellular telephone,
    said second end having a connector for attachment to said jack for receiving a telephone line.

6. The dock of claim 1 for use in a vehicle having a CD ROM and said computer having a jack for receiving a connector for a CD ROM, said dock further comprising
    a cable having a first end and a second end,
    said first end of said cable connectable to said CD ROM,
    said second end having a connector for attachment to said jack for receiving a CD ROM.

7. The dock of claim 1 for use in a vehicle having a floppy disc reader and said computer having a jack for receiving a connector for a floppy disc reader, said dock further comprising
    a cable having a first end and a second end,
    said first end of said cable connectable to said floppy disc reader,
    said second end having a connector for attachment to said jack for receiving a floppy disc reader.

8. The dock of claim 1 wherein said attachment means for releasably retaining saidcomputer includes a rotatable table, and means for retaining said computer to said table, said table rotatable from a first position in which a long side of said computer is aligned with a longitudinal axis of said moveable member to a second position where said long side of said computer is perpendicular to said longitudinal axis.

9. The dock of claim 1 for use in a vehicle having a global positioning detector, a cellular telephone, a CD ROM reader and a floppy disc reader, said computer having jacks for receiving connectors for a global positioning detector, a telephone line, a CD ROM reader and a floppy disc reader, said dock further comprising a first cable having a first end connectable to said electric system of said vehicle and a connector on a second end for attachment to said jack for receiving a power cable, a second cable having a first end attachable to said global positioning detector and a connector on a second end for attachment to said jack for receiving a global positioning detector, a third cabling having a first end attachable to said cellular telephone and a connector on a second end for attachment to said jack for a telephone line, a fourth cable having a first end attachable to said CD ROM reader and a connector on a second end for attachment to said jack for receiving a CD ROM reader, and a fifth cable having a first end attachable to said floppy disc reader and a connector on a second end for attachment to said jack for receiving a floppy disc reader.

10. The dock for retaining a computer in accordance with claim 1 wherein said plane defined by said table is vertical when said table is in said second position.

11. The dock for retaining a computer in accordance with claim 1 and further comprising rotating means on said table for rotating said computer mounted thereon about an axis perpendicular to an axis of rotation of said pivot means.

12. The dock for retaining a computer in accordance with claim 11 wherein said, said plain of said table is horizontal which said table is in said second portion.

13. A dock for retaining a computer having a jack for receiving a connection for a power cable, said dock for use in an automobile having a dashboard, a console forming a drivers foot well and a passenger foot well, and an electrical system, said dock comprising a housing, mounting means for mounting said housing against a surface in said passenger foot well of said automobile, a moveable member moveable with respect to housing moveable from a retracted position wherein said moveable member is within said housing to an extended position wherein a portion of said moveable member extends outward of said housing, and attachment means on said moveable member for releasably retaining said computer to said moveable member wherein said computer is moveable from a first position retracted within said housing while said housing is in said passenger foot well, to a second position exterior of said housing, where said computer is usable by a passenger in said automobile.

14. The dock of claim 13 wherein said housing will receive said moveable member with said computer attached thereto while said moveable member is in said retracted position.

15. The dock of claim 13 and further comprising a cable having a first end and a second end, said first end connectable into said electrical systems of said vehicle, and said second end having a connector for attachment to said jack of said computer.

16. The dock of claim 13 for use in a vehicle having a global positioning detector and said computer having a jack for receiving a connector for a global positioning detector, said dock further comprising a cable having a first end and a second end, said first end of said cable connectable to said global positioning detector, and said second end having a connector for attachment to said jack for receiving a connector for a global positioning detector.

17. The dock of claim 13 for use in a vehicle having a cellular telephone therein and said computer having a jack for receiving a connector for a telephone line, said dock further comprising a cable having a first end and a second end, said first end of said cable connectable to said cellular telephone, and said second end having a connector for attachment to said jack for receiving a telephone line.

18. A dock in accordance with claim 13 for use in a vehicle having a CD ROM and said computer having a jack for receiving a connector for a CD ROM, said dock further comprising a cable having a first end and a second end, said first end of said cable connectable to said CD ROM, said second end having a connector for attachment to said jack for receiving a CD ROM.

19. The dock of claim 13 for use in a vehicle having a floppy disc reader and said computer having a jack for receiving a connector for a floppy disc reader, said dock further comprising a cable having a first end and a second end, said first end of said cable connectable to said floppy disc reader, said second end having a connector for attachment to said jack for receiving a floppy disc reader.

20. The dock of claim 13 wherein said computer has a long side, and said moveable member has a longitudinal axis, said attachment means further comprising a retainer for releasably retaining said computer thereto, a pivot between said moveable member and said retainer for pivoting said computer from a first orientation in which said long side of said computer is parallel with said axis of said moveable member and a second orientation in which said long side is vertically oriented.

21. The dock of claim 13 for use in a vehicle having a global position detector, a cellular telephone, a CD ROM reader and a floppy disc reader, said computer having jacks for receiving connectors for a global positioning detector, a telephone line, a CD ROM reader and a floppy disc reader, said dock further comprising a first cable having a first end connectable to said electric system of said vehicle and a connector on a second end for attachment to said jack for receiving a power cable, a second cable having a first end attachable to said global positioning detector and a connector on a second end for attachment to said jack for receiving a global positioning detector, a third cable having a first end attachable to said cellular telephone and a connector on a second end for attachment to said jack for a telephone line, a fourth cable having a first end attachable to said CD ROM reader and a connector on a second end for attachment to said jack for receiving a CD ROM reader, and a fifth cable having a first end attachable to said floppy disc reader and a connector on a second end for attachment to said jack for receiving a floppy disc reader.

* * * * *

UNITED STATES PATENT AND TRADEMARK OFFICE
CERTIFICATE OF CORRECTION

PATENT NO. : 6,381,133 B1
DATED : April 30, 2002
INVENTOR(S) : Jack Chen

It is certified that error appears in the above-identified patent and that said Letters Patent is hereby corrected as shown below:

Column 3,
Line 32, after "shown." delete "The" and substitute -- To --.

Column 6,
Line 60, after "retaining" delete "saidcomputer" and substitute -- said computer --.

Column 7,
Line 13, after "third" delete "cabling" and substitute -- cable --.
Line 32, after "wherein" delete "said."
Line 33, beginning of the line, delete "which" and substitute -- when --.

Signed and Sealed this

Third day of September, 2002

Attest:

JAMES E. ROGAN
Attesting Officer
Director of the United States Patent and Trademark Office